Nov. 30, 1954  C. F. FORBES  2,695,683
CASTER BRAKE

Filed Dec. 2, 1949  2 Sheets-Sheet 1

INVENTOR
CHARLES F. FORBES
BY
*Mason & Graham*
ATTORNEYS

Nov. 30, 1954   C. F. FORBES   2,695,683
CASTER BRAKE
Filed Dec. 2, 1949   2 Sheets-Sheet 2
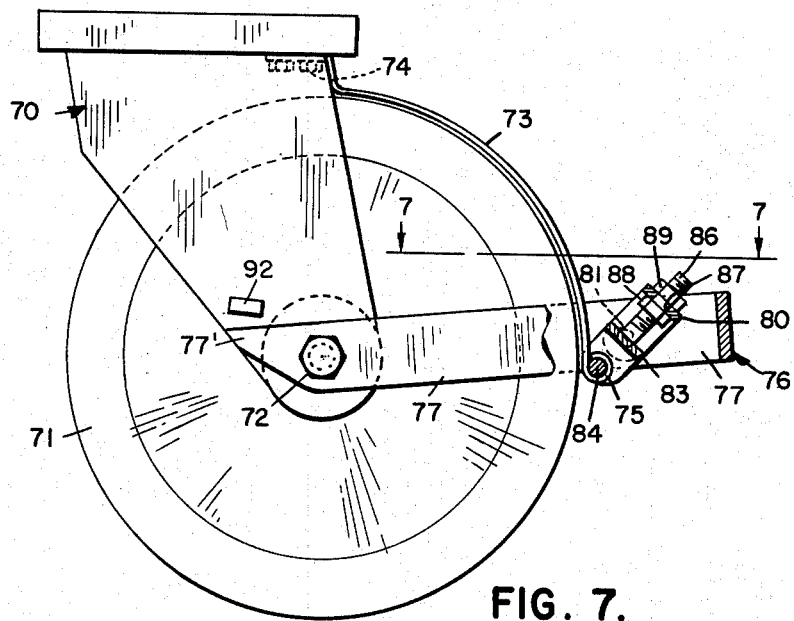
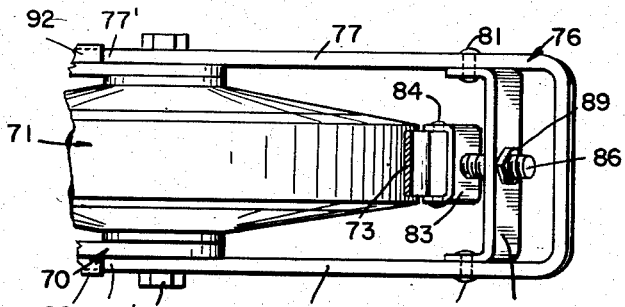
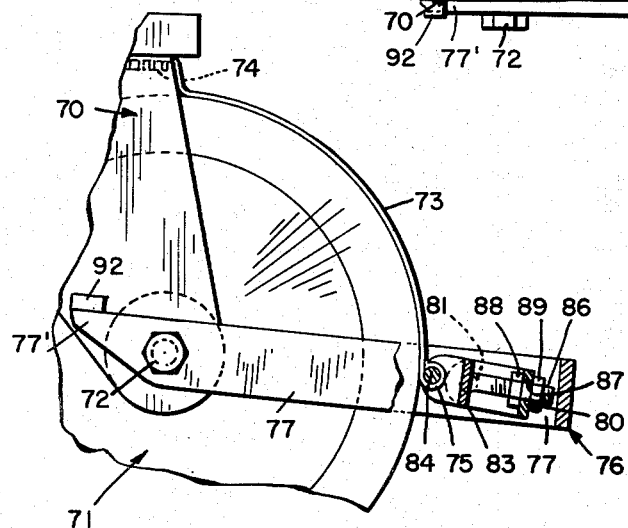
INVENTOR
CHARLES F. FORBES
BY
*Mason & Graham*
ATTORNEYS United States Patent Office 2,695,683
Patented Nov. 30, 1954

2,695,683

CASTER BRAKE

Charles F. Forbes, Los Angeles, Calif.

Application December 2, 1949, Serial No. 130,770

3 Claims. (Cl. 188—77)

This invention has to do with casters and particularly with means for locking the caster axle against rotation. This application is a continuation in part of my co-pending application for patent for caster brake Serial No. 683,673, filed July 15, 1946, now Patent No. 2,494,696, issued January 17, 1950.

An object of the invention is to provide a novel caster brake for use in releasably locking a caster wheel against rotation.

Another object is to provide a caster brake which can be easily operated by the foot and which, when moved to braking position, will remain in such position until released.

A further object is to provide an adjustable caster brake embodying a brake band and adjustable means for actuating the band into engagement with a caster wheel.

A still further object is to provide a simple form of caster brake which can be easily fabricated and installed.

These and other objects will be apparent from the drawings and the following description thereof.

Referring to the drawings:

Fig. 6 is a fragmentary side elevational view partly broken away showing a caster embodying another form of the invention;

Fig. 7 is a sectional view on line 7—7 of Fig. 6; and

Fig. 8 is a fragmentary view similar to Fig. 6 but showing the parts in braking position.

Figure 1:
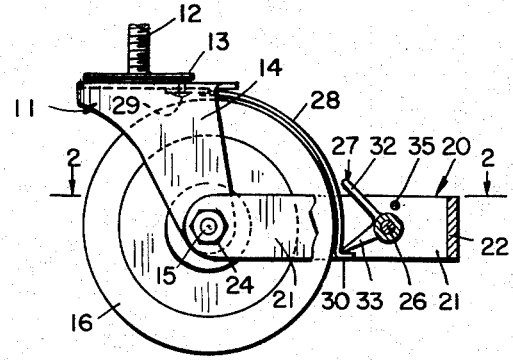
Fig. 1 is a side elevational view partly broken away of a caster embodying the invention.

More particularly describing the invention, reference numeral 11 indicates the horn of a caster which is provided with a mounting bolt 12 and mounting plate 13. The legs 14 of the horn are apertured to receive axle 15 upon which is rotatively mounted a wheel or roller 16.

Figure 3:
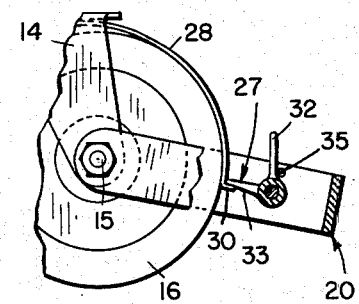
Fig. 3 is a fragmentary view in the plane of the view of Fig. 1 but showing the parts in braking position.
Figure 2:
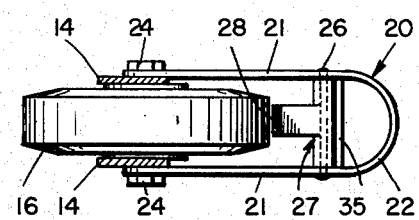
Fig. 2 is a sectional view on line 2—2 of Fig. 1.

The caster brake means in the form of the invention shown in Figs. 1–3 comprises an operating lever, generally indicated by 20, which is preferably in the form of a U-shaped yoke having a pair of legs 21 and a connecting end wall 22. The legs of the yoke are pivotally supported on the axle 15 and are retained by nuts 24 which can be threaded on the ends of the axle. Supported by and extending between the legs of the yoke is a pin 26, on which is mounted a brake band actuating lever 27. The caster is provided with a brake band 28, the upper end of which is secured to the horn of the caster in any conventional manner, as by a rivet or rivets 29. The lower end of the band is provided with an outwardly projecting tip 30, the remainder of the band being curved to be substantially concentric with the periphery of the caster wheel.

The brake band actuating lever 27 is mounted for pivotal movement on the pin 26 and resembles a bell crank in shape, having an upper arm 32 and a lower arm 33. The end of the latter normally contacts the brake band at the intersection of the tip 30 and the main portion of the band. A stop pin 35 is mounted between the legs 21 of the operating lever for the purpose of limiting movement of the actuating lever.

In the operation of the device, referring to Fig. 3, it will be apparent that when the operating lever 20 is depressed, the actuating lever 27 rotates on pin 26, forcing the brake band into tight engagement with the caster wheel by a toggle-like action. The stop pin 35 limits the movement of the actuating lever, permitting it to move sufficiently, however, so that the lower arm 33 is past center. As a result, the brake remains in braking position until the operating lever is raised. The upper arm 32 of the lever 27 serves to retain the lower arm 33 adjacent the brake band in the event the operating lever 20 is raised.

Figure 4:
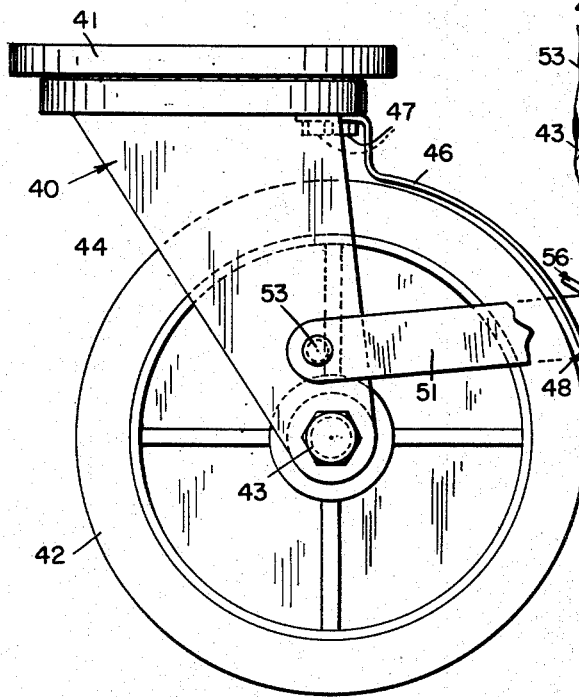
Fig. 4 is a side elevational view of a caster showing another form of the invention.
Figure 5:
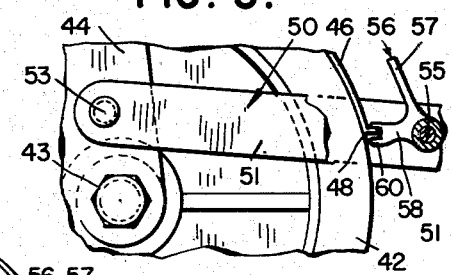
Fig. 5 is a fragmentary view similar to Fig. 4 but showing the parts in braking position.

In Figs. 4 and 5 there is shown another form of the invention wherein a caster having a horn 40, mounting plate 41, and caster wheel 42 as shown. The wheel is rotatively mounted on an axle 43 extending between the legs 44 of the horn.

The horn is provided with a brake band 46 which is attached to the horn by bolts 47. The brake band is curved to correspond to the curvature of the wheel and is provided with an outwardly extending tip end 48.

An operating lever 50 in the form of a yoke having legs 51 and a connecting end portion 52 is mounted on the horn, the legs being secured to the horn above the axle as by rivets 53.

The operating lever is provided with a cross pin 55 mounted in the legs which pivotally supports an actuating lever 56. The general shape of the lever is similar to the lever 27 previously described, the lever having an upper arm 57 and a lower arm 58. However, the lever 56 is provided with a recessed end portion 60 at the lower end of the leg 58. This recessed end portion loosely receives the tip end 48 of the brake band and serves to limit downward movement of the operating lever. The arm 57 serves to retain the lower end 48 of the brake band within the recessed end portion 60 of arm 58 upon upward movement of the operating lever and thus, in conjunction with the recessed end portion, limits upward movement of the operating lever.

By reference to Fig. 5, it will be seen that when the operating lever 50 is depressed, the parts move to the position in which they are shown in that figure with the result that the actuating lever forces the brake band into tight engagement with the wheel 42.

In Figs. 6–8 there is shown another form of the invention in which the brake actuating lever mechanism is adjustable. Referring to these figures, 70 indicates the horn of a caster in which is mounted the wheel 71 on axle 72. The caster is provided with a brake band 73 which is mounted as by screws 74 at the upper part of the horn. The lower end of the brake band is formed to provide an outwardly extending pin-receiving section 75.

The caster is provided with an operating lever 76 of generally U-shape, the legs 77 of which are pivotally mounted on the axle 72. An actuating lever mechanism is mounted between the operating lever and brake band and includes a strap 80, the ends of which are secured by rivets 81 to the legs of the operating lever and a U-shaped bracket 83, which is secured to the brake band through the medium of pin 84, is mounted in the turned tip end 75 of the brake band. The bracket 83 is adjustably secured to the strap 80 by threaded post 86 which is received within a hole 87 in the strap. Nuts 88 and 89 serve to secure the parts in an adjusted position.

By reference to Figs. 6 and 8 it will be apparent that by depressing the operating lever 76 the brake band actuating means will pivot thereon and on the brake band to releasably lock the band in tight engagement with the wheel. By having the bracket 83 adjustably mounted on the strap 80, the amount of force exerted on the brake band may be varied and the device adjusted to compensate for wear of the wheel.

In order to limit movement of the lever 76, stop projections 92 are provided on the horn, and these are abutted by ends 77' of legs 77 as shown in Fig. 8.

Although the invention has been particularly shown and described, it is contemplated that various changes and modifications may be made without departing from the scope thereof as indicated by the following claims.

I claim:

1. In a caster, a wheel-carrying structure, a wheel rotatable therein, a brake band secured at one end to said structure and surrounding a portion of the periphery of the wheel, the other end of said band being free, an operating lever pivotally mounted on the wheel-carrying structure for movement within planes parallel to the sides of the wheel, and a brake band actuating lever pivotally mounted on said operating lever, said actuating lever engaging said brake band and forming an acute angle with said operating lever, said actuating lever being adjustable to vary the length thereof.

2. In a caster, a wheel-carrying structure, a wheel rotatable therein, a brake band secured at one end to said structure and surrounding a portion of the periphery of the wheel, an operating lever in the form of a yoke pivotally mounted on the wheel-carrying structure for movement within planes parallel to the sides of the wheel, an actuating lever means carried by said operating lever for actuating said brake band comprising a bracket pivotally secured to the free end of said brake band, a strap pivotally secured across the legs of the operating lever outwardly of the brake band, and a longitudinally adjustable post connecting said bracket and said strap.

3. A structure as defined in claim 2 in which said operating lever is pivotally mounted on the axis of rotation of said wheel and in which means is provided on said wheel-carrying structure for limiting downward movement of said operating lever.

References Cited in the file of this patent

UNITED STATES PATENTS

| Number | Name | Date |
|---|---|---|
| 1,297,093 | Carr | Mar. 11, 1919 |
| 1,932,299 | Wipperman | Oct. 24, 1933 |
| 1,998,236 | Herold | Apr. 16, 1935 |
| 2,494,696 | Forbes | Jan. 17, 1950 |